US009928927B2

(12) United States Patent
McGuire

(10) Patent No.: US 9,928,927 B2
(45) Date of Patent: *Mar. 27, 2018

(54) HEATING PLASMA FOR FUSION POWER USING MAGNETIC FIELD OSCILLATION

(71) Applicant: Lockheed Martin Corporation, Bethesda, MD (US)

(72) Inventor: Thomas John McGuire, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 144 days.

This patent is subject to a terminal disclaimer.

(21) Appl. No.: 14/243,447

(22) Filed: Apr. 2, 2014

(65) Prior Publication Data

US 2014/0301519 A1   Oct. 9, 2014

Related U.S. Application Data

(60) Provisional application No. 61/808,136, filed on Apr. 3, 2013, provisional application No. 61/808,122, filed
(Continued)

(51) Int. Cl.
*G21B 1/05* (2006.01)
*H05H 1/14* (2006.01)

(52) U.S. Cl.
CPC ............. *G21B 1/05* (2013.01); *G21B 1/052* (2013.01); *H05H 1/14* (2013.01); *Y02E 30/122* (2013.01); *Y02E 30/126* (2013.01)

(58) Field of Classification Search
USPC ........................................ 376/139–142, 127
See application file for complete search history.

(56) References Cited

U.S. PATENT DOCUMENTS 2,969,308 A * 1/1961 Bell .................... G21B 1/00 313/161
3,005,767 A   10/1961 Boyer
(Continued)

FOREIGN PATENT DOCUMENTS

JP      07-022231      1/1995
JP      07-191169      7/1995
(Continued)

OTHER PUBLICATIONS

PCT Notification of Transmittal of the International Search Report and the Written Opinion of the International Searching Authority, or the Declaration for International application No. PCT/US2014/032754, dated Dec. 11, 2014.
(Continued)

*Primary Examiner* — Jack W Keith
*Assistant Examiner* — Lily C Garner
(74) *Attorney, Agent, or Firm* — Baker Botts L.L.P.

(57) ABSTRACT

In one embodiment, a fusion reactor includes two internal magnetic coils suspended within an enclosure, a center magnetic coil coaxial with the two internal magnetic coils and located proximate to a midpoint of the enclosure, a plurality of encapsulating magnetic coils coaxial with the internal magnetic coils, and two mirror magnetic coil coaxial with the internal magnetic coils. The fusion reactor is configured to vary electrical currents supplied to the magnetic coils to heat the plasma confined within the magnetic wall.

26 Claims, 11 Drawing Sheets

Related U.S. Application Data on Apr. 3, 2013, provisional application No. 61/808,131, filed on Apr. 3, 2013, provisional application No. 61/807,932, filed on Apr. 3, 2013, provisional application No. 61/808,110, filed on Apr. 3, 2013, provisional application No. 61/808,066, filed on Apr. 3, 2013, provisional application No. 61/808,093, filed on Apr. 3, 2013, provisional application No. 61/808,089, filed on Apr. 3, 2013, provisional application No. 61/808,101, filed on Apr. 3, 2013, provisional application No. 61/808,154, filed on Apr. 3, 2013.

(56) References Cited

U.S. PATENT DOCUMENTS

| | | | |
|---|---|---|---|
| 3,012,955 A | 12/1961 | Kulsrud et al. | |
| 3,038,099 A * | 6/1962 | Baker | H05H 1/11 313/161 |
| 3,069,344 A * | 12/1962 | Post | H05H 1/00 250/423 R |
| 3,071,525 A * | 1/1963 | Christofilos | H05H 1/22 313/161 |
| 3,072,551 A | 1/1963 | Schlelein | |
| 3,141,826 A * | 7/1964 | Friedrichs | H05H 1/11 313/161 |
| 3,117,912 A | 12/1964 | Imhoff et al. | |
| 3,218,562 A * | 11/1965 | Serduke | H05H 5/06 313/62 |
| 3,230,418 A * | 1/1966 | Kerr | H05H 1/11 313/161 |
| 3,324,316 A | 6/1967 | Cann | |
| 3,361,634 A | 1/1968 | Smullin | |
| 3,655,508 A | 4/1972 | Hirsch | |
| 3,664,921 A | 5/1972 | Christofilos | |
| 3,831,101 A | 8/1974 | Benford | |
| 4,065,351 A | 12/1977 | Jassby et al. | |
| 4,125,431 A * | 11/1978 | Fowler | H05H 1/14 376/130 |
| 4,233,537 A * | 11/1980 | Limpaecher | H05H 1/14 313/161 |
| 4,252,608 A * | 2/1981 | Baldwin | H05H 1/14 376/127 |
| 4,267,488 A | 5/1981 | Wells | |
| 4,354,998 A | 10/1982 | Ohkawa | |
| 4,401,618 A | 8/1983 | Salisbury | |
| 4,615,861 A | 10/1986 | Fisch | |
| 4,641,060 A | 2/1987 | Dandl | |
| 4,960,990 A | 10/1990 | Lavan | |
| 6,593,539 B1 | 7/2003 | Miley et al. | |
| 7,128,980 B2 | 10/2006 | Schedler et al. | |
| 7,230,201 B1 * | 6/2007 | Miley | G21B 1/03 219/121.36 |
| 2005/0279628 A1 | 12/2005 | Vukovic | |
| 2008/0226011 A1 | 9/2008 | Barnes | |
| 2011/0096887 A1 | 4/2011 | Piefer | |
| 2012/0085917 A1 | 4/2012 | Kurunczi | |
| 2014/0301517 A1 | 10/2014 | McGuire | |
| 2014/0301518 A1 | 10/2014 | McGuire | |

FOREIGN PATENT DOCUMENTS

| | | |
|---|---|---|
| JP | 09-005466 | 1/1997 |
| JP | 2001-066389 | 3/2001 |
| JP | 2008-008906 | 1/2008 |
| JP | 2008-516462 | 5/2008 |
| JP | 2008-268191 | 11/2008 |
| JP | 2010-243501 | 10/2010 |
| WO | WO 2013/074666 | 5/2013 |

OTHER PUBLICATIONS

PCT Notification of Transmittal of the International Search Report and the Written Opinion of the International Searching Authority, or the Declaration for International application No. PCT/US2014/032759, dated Dec. 18, 2014.
PCT Notification of Transmittal of the International Search Report and the Written Opinion of the International Searching Authority, or the Declaration for International application No. PCT/US2014/032751, dated Dec. 19, 2014.
PCT Notification of Transmittal of the International Search Report and the Written Opinion of the International Searching Authority, or the Declaration for International application No. PCT/US2014/032749, dated Dec. 18, 2014.
PCT Notification of Transmittal of the International Search Report and the Written Opinion of the International Searching Authority, or the Declaration for International application No. PCT/US2014/032772, dated Mar. 19, 2015.
PCT Notification of Transmittal of the International Search Report and the Written Opinion of the International Searching Authority, or the Declaration for International application No. PCT/US2014/032764, dated Mar. 5, 2015.
PCT Notification of Transmittal of the International Search Report and the Written Opinion of the International Searching Authority, or the Declaration for International application No. PCT/US2014/032767, dated Mar. 19, 2015.
PCT Notification of Transmittal of Int'l Search Report and Written Opinion of the Int'l Searching Authority, or the Declaration, with attached Int'l Search Report and Written Opinion of the Int'l Searching Authority; Int'l appl. PCT/US2014/032757, Int'l filing date Apr. 3, 2014; (14 pgs), dated Aug. 22, 2014.
L. Bromberg et al., "Innovative Design Options for Internal Coils", vol. PFC/JA-90-42; Ninth Topical Meeting on the Technology of Fusion Energy, Oak Brook, Illinois, Oct. 7-11, 1990, XP-002727474, pp. 1-8.
Imazawa et al, "Spherical Tokamak Generation and Merging on UTST Using Ex-Vessel Poloidal Field Coils Only"; Electrical Engineering in Japan, vol. 179, No. 4, Jun. 2012, ISSN: 0424-7760; XP-002727492, pp. 18-24.
D.R. Cohn et al., "Advantages of High Field Tokamaks for Fusion Reactor Development", vol. PFC/JA-85-39; Plasma Fusion Center—MIT, Cambridge, MA.; XP-002727475, pp. 1-23, Dec. 1985.
A. I. Morozov, V.V. Savel'ev; Reviews of Topical Problems; On Galateas—magnetic traps with plasma-embedded conductors; 1998 Uspekhi Fizicheskikh Nauk, Russian Academy of Sciences; Physics—Uspekhi 41 (11) 1049-1089.
Louis C. Burkhardt, Joseph N. DiMarco, and Hugh J. Karr; Plasma Injection and Trapping in a Caulked Stuffed Cusp Magnetic Field; Phys. Fluids 12, 1894 (1969); http://dx.doi.org/10.1063/1.1692757.
Taijiro Uchida and Riuichi Akiyama; Stable Curved Theta-Pinch Plasma in a Series of Caulked Cusp Fields; Phys. Rev. Lett. 24, 1157, Published May 25, 1970.
T. J. McGuire, U.S. Appl. No. 14/242,999, Response to Non-final Office Action filed Mar. 11, 2016.
T. J. McGuire, U.S. Appl. No. 14/242,939, filed Apr. 2, 2014.
T. J. McGuire, U.S. Appl. No. 14/242,971, filed Apr. 2, 2014.
T. J. McGuire, U.S. Appl. No. 14/242,923, filed Apr. 2, 2014.
T. J. McGuire, U.S. Appl. No. 14/243,605, filed Apr. 2, 2014.
T. J. McGuire, U.S. Appl. No. 14/243,368, filed Apr. 2, 2014.
T. J. McGuire, U.S. Appl. No. 14/242,999, Non-final Office Action dated Dec. 11, 2015.
Intellectual Property Office of Singapore, Office Action (Written Opinion) re Patent Application No. 11201508212S, dated Jun. 13, 2016.
Intellectual Property Office of Singapore, Office Action (Written Opinion) re Patent Application No. 11201508213X, dated Jun. 16, 2016.
Intellectual Property Office of Singapore, Examination Report re Patent Application No. 11201508228S, dated Jun. 28, 2016.
U.S. Appl. No. 14/242,999, After Final Office Action, dated Apr. 25, 2016.
Response to Non-Final Office Action for U.S. Appl. No. 14/242,939, dated May 9, 2017.
Non-final Office Action for U.S. Appl. No. 14/242,971, dated May 12, 2017.

(56) References Cited

OTHER PUBLICATIONS

Response to Non-final Office Action for U.S. Appl. No. 14/242,923, dated May 8, 2017.
Non-final Office Action for U.S. Appl. No. 14/243,605, dated May 10, 2017.
Non-final Office Action for U.S. Appl. No. 14/243,368, dated May 9, 2017.
Response to Non-final Office Action for U.S. Appl. No. 14/242,912, dated May 5, 2017.
Request for Continued Examination filed with Amendment; U.S. Appl. No. 14/243,447, dated Jul. 22, 2016.
IP Australia Examination Report No. 1 Patent Application No. 2014281138, dated May 3, 2017.
IP Australia Examination Report No. 1 Patent Application No. 2014281139, dated May 4, 2017.
IP Australia Examination Report No. 1 Patent Application No. 2014281141, dated May 4, 2017.
IP Australia Examination Report No. 1 Patent Application No. 2014281142, dated May 4, 2017.
IP Australia Examination Report No. 1 Patent Application No. 2014248145, dated May 4, 2017.
IP Australia Examination Report No. 1 Patent Application No. 2014281140, dated May 18, 2017.
Response to Final Office Action for U.S. Appl. No. 14/242,999, dated May 1, 2017.
Advisory Action for U.S. Appl. No. 14/242,999, dated May 12, 2017.
Advisory Action for U.S. Appl. No. 14/242,999, dated Apr. 19, 2017.
Non-Final Office Action for U.S. Appl. No. 14/242,939, dated Jan. 9, 2017.
Final Office Action for U.S. Appl. No. 14/242,999, dated Jan. 31, 2017.
Non-Final Office Action for U.S. Appl. No. 14/242,923, dated Jan. 6, 2017.
Non-Final Office Action for U.S. Appl. No. 14/242,912, dated Jan. 5, 2017.
Intellectual Property Office of Singapore, Office Action (Notice of Allowance with Written Opinion) for Patent Application No. 11201508213X, dated Jan. 18, 2017.
Notice of Eligibility for Grant issued by the Intellectual Property Office of Singapore for Patent Application No. 11201508213X—dated Jan. 24, 2017.
Invitation to Respond to Written Opinion issued by the Intellectual Property Office of Singapore for Patent Application No. 112015082125, dated Dec. 29, 2016.
New Zealand Intellectual Property Office First Examination Report for IP No. 712921 (Examination Report on corresponding U.S. Appl. No. 14/242,912), dated Mar. 15, 2017.
New Zealand Intellectual Property Office First Examination Report for IP No. 712921 (Examination Report on corresponding U.S. Appl. No. 14/242,999), dated Mar. 15, 2017.
Final Office Action; U.S. Appl. No. 14/242,939; dated Jul. 5, 2017.
Non-Final Office Action; U.S. Appl. No. 14/242,999; dated Jun. 29, 2017.
Non-Final Office Action; U.S. Appl. No. 14/242,971; dated Aug. 4, 2017.
Final Office Action; U.S. Appl. No. 14/242,923; dated Aug. 3, 2017.
Response to Non-Final Office Action; U.S. Appl. No. 14/243,605; dated Aug. 10, 2017.
Response to Non-Final Office Action; U.S. Appl. No. 14/243,368; dated Aug. 9, 2017.
Final Office Action; U.S. Appl. No. 14/242,912; dated Aug. 1, 2017.
Saudi Arabia First Office Action for Patent Application No. 515361258 (with translation), dated May 23, 2017.
Chilean Office Action for PCT/2015-002947 dated Jul. 14, 2017 (with translation).
Singapore 11201508217R Office Action (Written Opinion) dated Jan. 8, 2018.
Singapore 11201508226P Office Action (Written Opinion) dated Jan. 8, 2018.
Japanese Office Action; 2016-506595 Notice of Reasons for Rejection; English translation included, dated Jan. 9, 2018.
Japanese Office Action; 2016-506597 Notice of Reasons for Rejection; English translation included, dated Jan. 9, 2018.
Japanese Office Action; 2016-506599; Notice of Reasons for Rejection; English Translation included, dated Jan. 9, 2018
Japanese Office Action; 2016-506596 Notice of Reasons for Rejection; English translation included, dated Jan. 16, 2018.
Japanese Office Action; 2016-506600 Notice of Reasons for Rejection; English translation included, dated Jan. 16, 2018.
Japanese Office Action; 2016/506602; Notice of Reasons for Rejection; English translation included, dated Jan. 16, 2018.

* cited by examiner

HEATING PLASMA FOR FUSION POWER USING MAGNETIC FIELD OSCILLATION

RELATED APPLICATIONS

This application claims the benefit under 35 U.S.C. § 119(e) of the priority of the following U.S. Provisional Applications filed on Apr. 3, 2013, the entire disclosures of which are hereby incorporated by reference: U.S. Provisional Application No. 61/808,136, entitled "MAGNETIC FIELD PLASMA CONFINEMENT FOR COMPACT FUSION POWER"; U.S. Provisional Application No. 61/808,122, entitled "MAGNETIC FIELD PLASMA CONFINEMENT FOR COMPACT FUSION POWER"; U.S. Provisional Application No. 61/808,131, entitled "ENCAPSULATION AS A METHOD TO ENHANCE MAGNETIC FIELD PLASMA CONFINEMENT"; U.S. Provisional Application No. 61/807,932, entitled "SUPPORTS FOR STRUCTURES IMMERSED IN PLASMA"; U.S. Provisional Application No. 61/808,110, entitled "RESONANT HEATING OF PLASMA WITH HELICON ANTENNAS"; U.S. Provisional Application No. 61/808,066, entitled "PLASMA HEATING WITH RADIO FREQUENCY WAVES"; U.S. Provisional Application No. 61/808,093, entitled "PLASMA HEATING WITH NEUTRAL BEAMS"; U.S. Provisional Application No. 61/808,089, entitled "ACTIVE COOLING OF STRUCTURES IMMERSED IN PLASMA"; U.S. Provisional Application No. 61/808,101, entitled "PLASMA HEATING VIA FIELD OSCILLATIONS"; and U.S. Provisional Application No. 61/808,154, entitled "DIRECT ENERGY CONVERSION OF FUSION PLASMA ENERGY VIA CYCLED ADIABATIC COMPRESSION AND EXPANSION".

TECHNICAL FIELD

This disclosure generally relates to fusion reactors and more specifically to heating plasma using magnetic field oscillations.

BACKGROUND

Fusion power is power that is generated by a nuclear fusion process in which two or more atomic nuclei collide at very high speed and join to form a new type of atomic nucleus. A fusion reactor is a device that produces fusion power by confining and controlling plasma. Typical fusion reactors are large, complex, and cannot be mounted on a vehicle.

SUMMARY OF PARTICULAR EMBODIMENTS

According to one embodiment, a fusion reactor includes two internal magnetic coils suspended within an enclosure, a center magnetic coil coaxial with the two internal magnetic coils and located proximate to a midpoint of the enclosure, a plurality of encapsulating magnetic coils coaxial with the internal magnetic coils, and two mirror magnetic coil coaxial with the internal magnetic coils. The fusion reactor is configured to vary electrical currents supplied to the magnetic coils to heat the plasma confined within the magnetic wall.

Technical advantages of certain embodiments may include providing a compact fusion reactor that is less complex and less expensive to build than typical fusion reactors. Some embodiments may provide a fusion reactor that is compact enough to be mounted on or in a vehicle such as a truck, aircraft, ship, train, spacecraft, or submarine. Some embodiments may provide a fusion reactor that may be utilized in desalination plants or electrical power plants. Other technical advantages will be readily apparent to one skilled in the art from the following figures, descriptions, and claims. Moreover, while specific advantages have been enumerated above, various embodiments may include all, some, or none of the enumerated advantages.

DESCRIPTION OF EXAMPLE EMBODIMENTS

Fusion reactors generate power by confining and controlling plasma that is used in a nuclear fusion process. Typically, fusion reactors are extremely large and complex devices. Because of their prohibitively large sizes, it is not feasible to mount typical fusion reactors on vehicles. As a result, the usefulness of typical fusion reactors is limited.

The teachings of the disclosure recognize that it is desirable to provide a compact fusion reactor that is small enough to mount on or in vehicles such as trucks, trains, aircraft, ships, submarines, spacecraft, and the like. For example, it may be desirable to provide truck-mounted compact fusion reactors that may provide a decentralized power system. As another example, it may be desirable to provide a compact fusion reactor for an aircraft that greatly expands the range and operating time of the aircraft. In addition, it may desirable to provide a fusion reactor that may be utilized in power plants and desalination plants. The following describes an encapsulated linear ring cusp fusion reactor for providing these and other desired benefits associated with compact fusion reactors.

Figure 1:
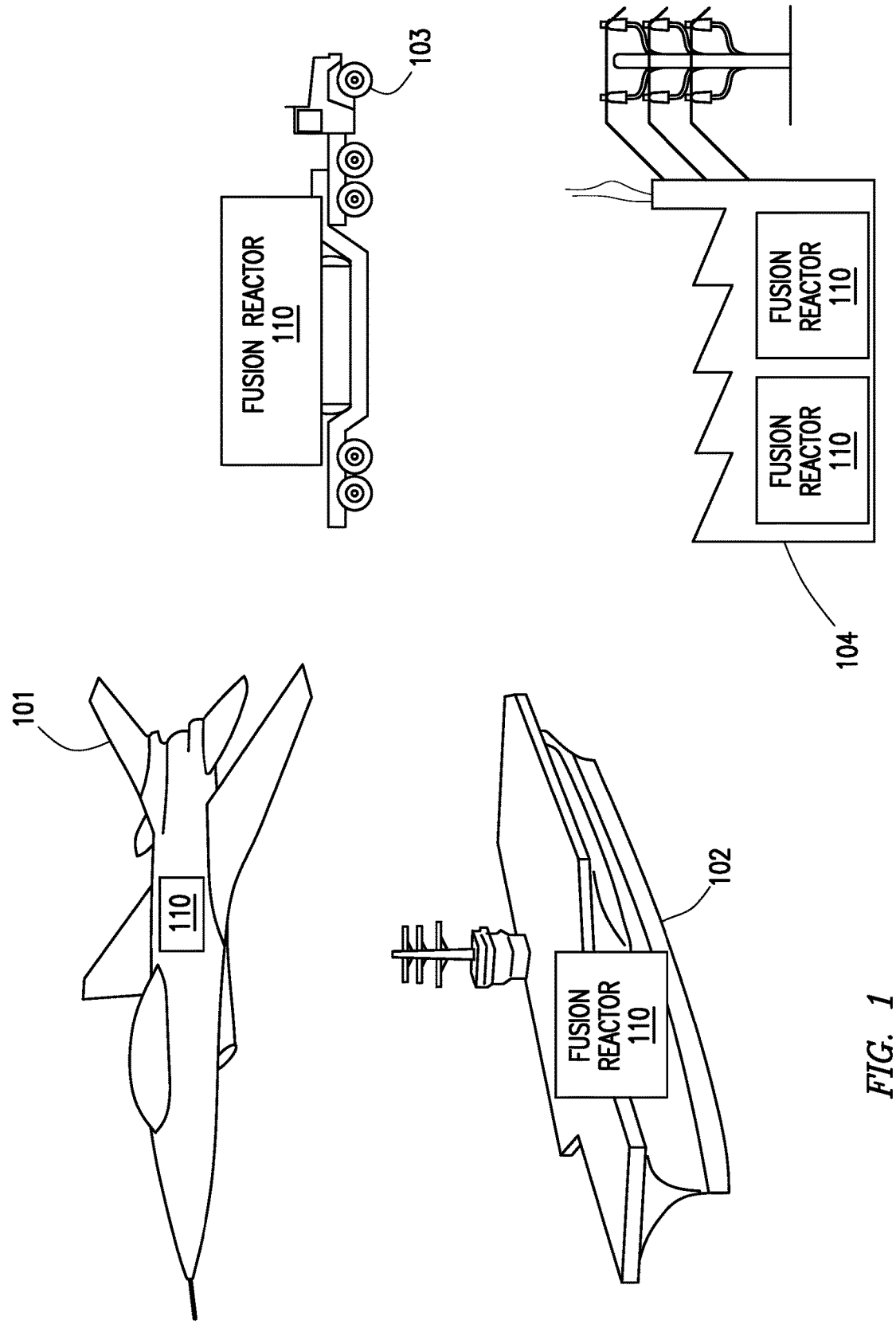
FIG. 1 illustrates example applications for fusion reactors, according to certain embodiments.

FIG. 1 illustrates applications of a fusion reactor 110, according to certain embodiments. As one example, one or more embodiments of fusion reactor 110 are utilized by aircraft 101 to supply heat to one or more engines (e.g., turbines) of aircraft 101. A specific example of utilizing one or more fusion reactors 110 in an aircraft is discussed in more detail below in reference to FIG. 2. In another example, one or more embodiments of fusion reactor 110 are utilized by ship 102 to supply electricity and propulsion power. While an aircraft carrier is illustrated for ship 102 in FIG. 1, any type of ship (e.g., a cargo ship, a cruise ship, etc.) may utilize one or more embodiments of fusion reactor 110. As another example, one or more embodiments of fusion reactor 110 may be mounted to a flat-bed truck 103 in order to provide decentralized power or for supplying power to remote areas in need of electricity. As another example, one or more embodiments of fusion reactor 110 may be utilized by an electrical power plant 104 in order to provide electricity to a power grid. While specific applications for fusion reactor 110 are illustrated in FIG. 1, the disclosure is not limited to the illustrated applications. For example, fusion reactor 110 may be utilized in other applications such as trains, desalination plants, spacecraft, submarines, and the like.

In general, fusion reactor 110 is a device that generates power by confining and controlling plasma that is used in a nuclear fusion process. Fusion reactor 110 generates a large amount of heat from the nuclear fusion process that may be converted into various forms of power. For example, the heat generated by fusion reactor 110 may be utilized to produce steam for driving a turbine and an electrical generator, thereby producing electricity. As another example, as discussed further below in reference to FIG. 2, the heat generated by fusion reactor 110 may be utilized directly by a turbine of a turbofan or fanjet engine of an aircraft instead of a combustor.

Fusion reactor 110 may be scaled to have any desired output for any desired application. For example, one embodiment of fusion reactor 110 may be approximately 10 m×7 m and may have a gross heat output of approximately 100 MW. In other embodiments, fusion reactor 110 may be larger or smaller depending on the application and may have a greater or smaller heat output. For example, fusion reactor 110 may be scaled in size in order to have a gross heat output of over 200 MW.

Figure 2:
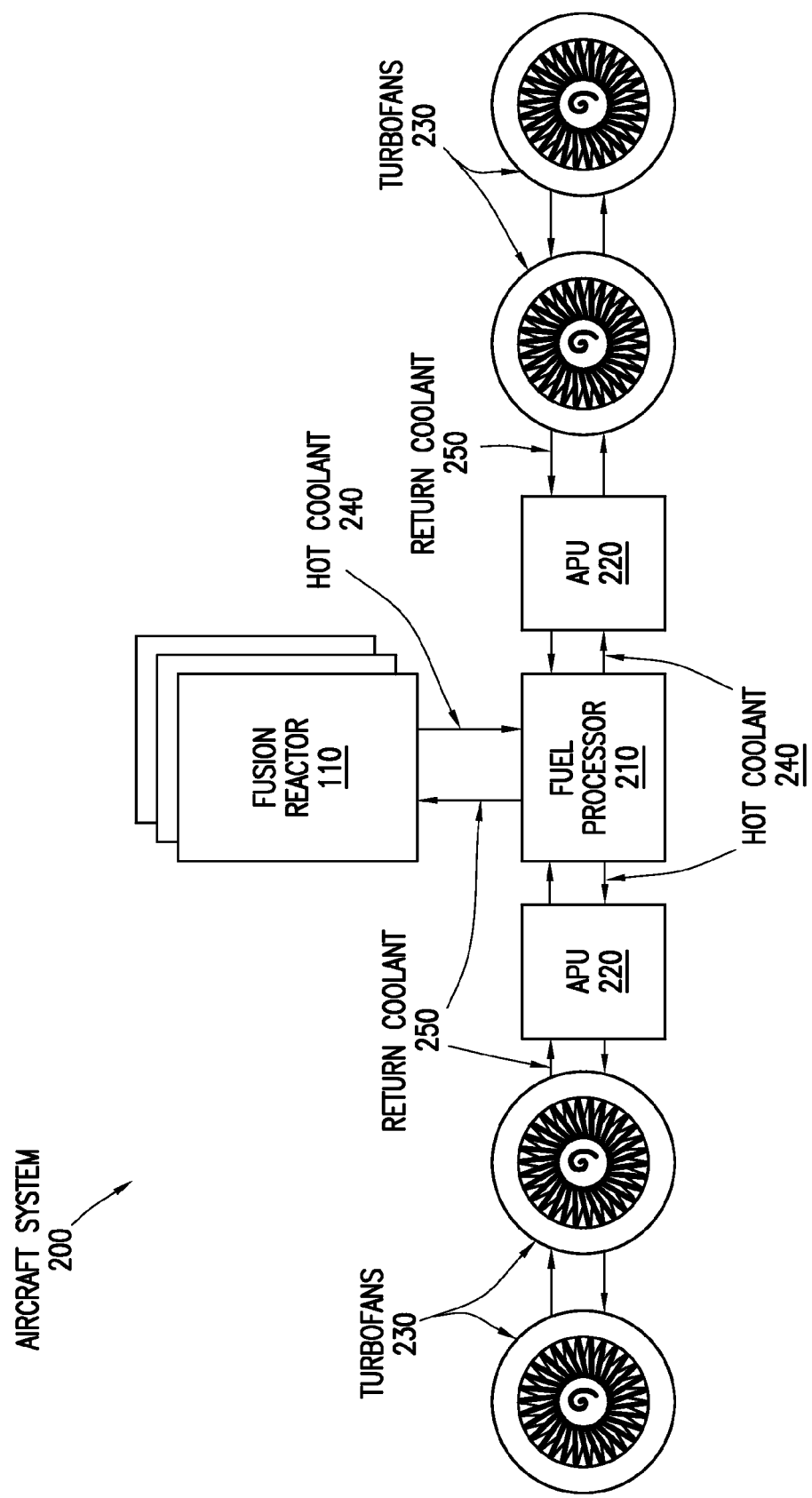
FIG. 2 illustrates an example aircraft system utilizing fusion reactors, according to certain embodiments.

FIG. 2 illustrates an example aircraft system 200 that utilizes one or more fusion reactors 110, according to certain embodiments. Aircraft system 200 includes one or more fusion reactors 110, a fuel processor 210, one or more auxiliary power units (APUs) 220, and one or more turbofans 230. Fusion reactors 110 supply hot coolant 240 to turbofans 230 (e.g., either directly or via fuel processor 210) using one or more heat transfer lines. In some embodiments, hot coolant 240 is FLiBe (i.e., a mixture of lithium fluoride (LiF) and beryllium fluoride ($BeF_2$)) or LiPb. In some embodiments, hot coolant 240 is additionally supplied to APUs 220. Once used by turbofans 240, return coolant 250 is fed back to fusion reactors 110 to be heated and used again. In some embodiments, return coolant 250 is fed directly to fusion reactors 110. In some embodiments, return coolant 250 may additionally be supplied to fusion reactors 110 from APUs 220.

In general, aircraft system 200 utilizes one or more fusion reactors 110 in order to provide heat via hot coolant 240 to turbofans 230. Typically, a turbofan utilizes a combustor that burns jet fuel in order to heat intake air, thereby producing thrust. In aircraft system 200, however, the combustors of turbofans 230 have been replaced by heat exchangers that utilize hot coolant 240 provided by one or more fusion reactors 110 in order to heat the intake air. This may provide numerous advantages over typical turbofans. For example, by allowing turbofans 230 to operate without combustors that burn jet fuel, the range of aircraft 101 may be greatly extended. In addition, by greatly reducing or eliminating the need for jet fuel, the operating cost of aircraft 101 may be significantly reduced.

Figure 3A:
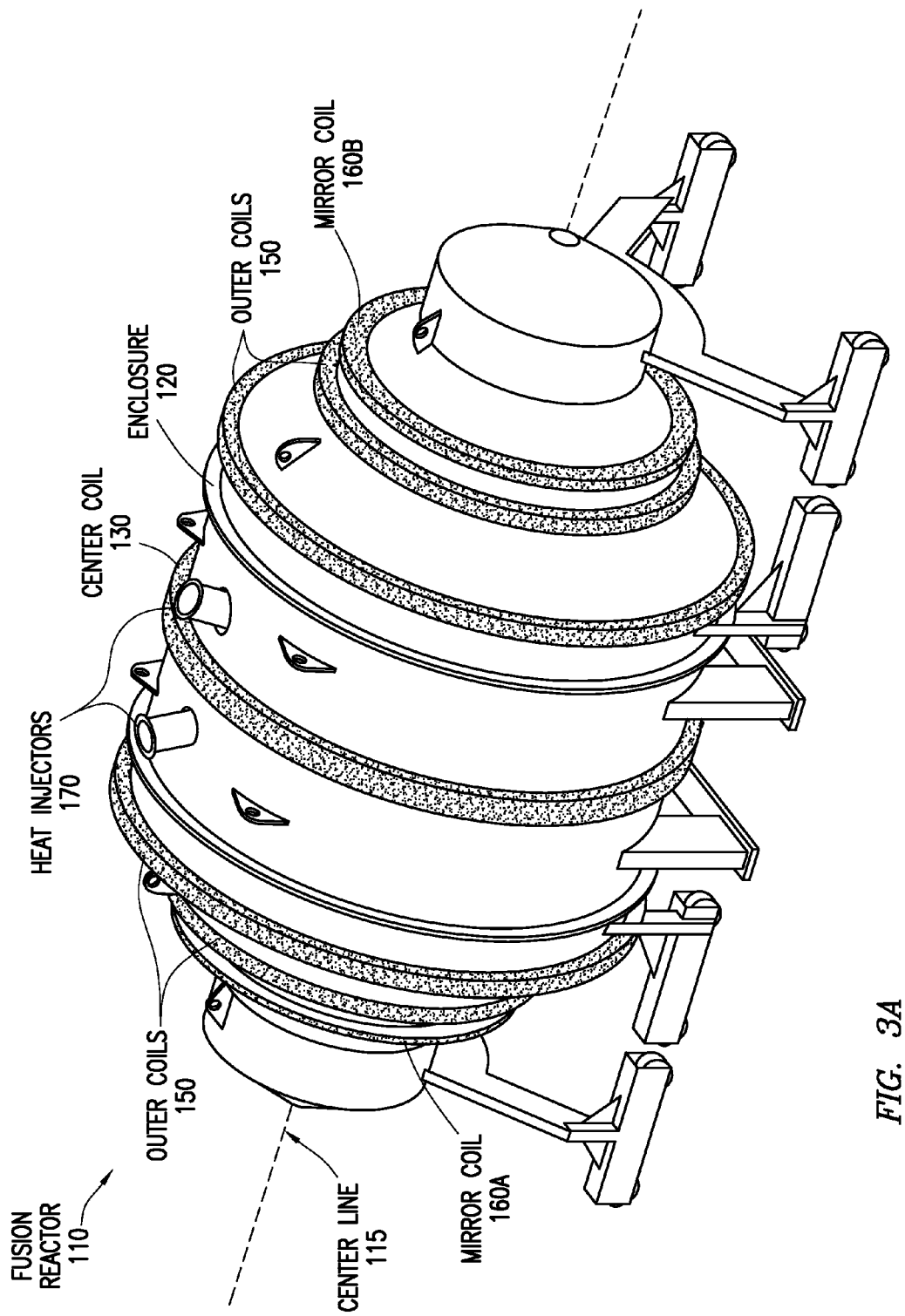
FIGS. 3A and 3B illustrate an example fusion reactor, according to certain embodiments.
Figure 3B:
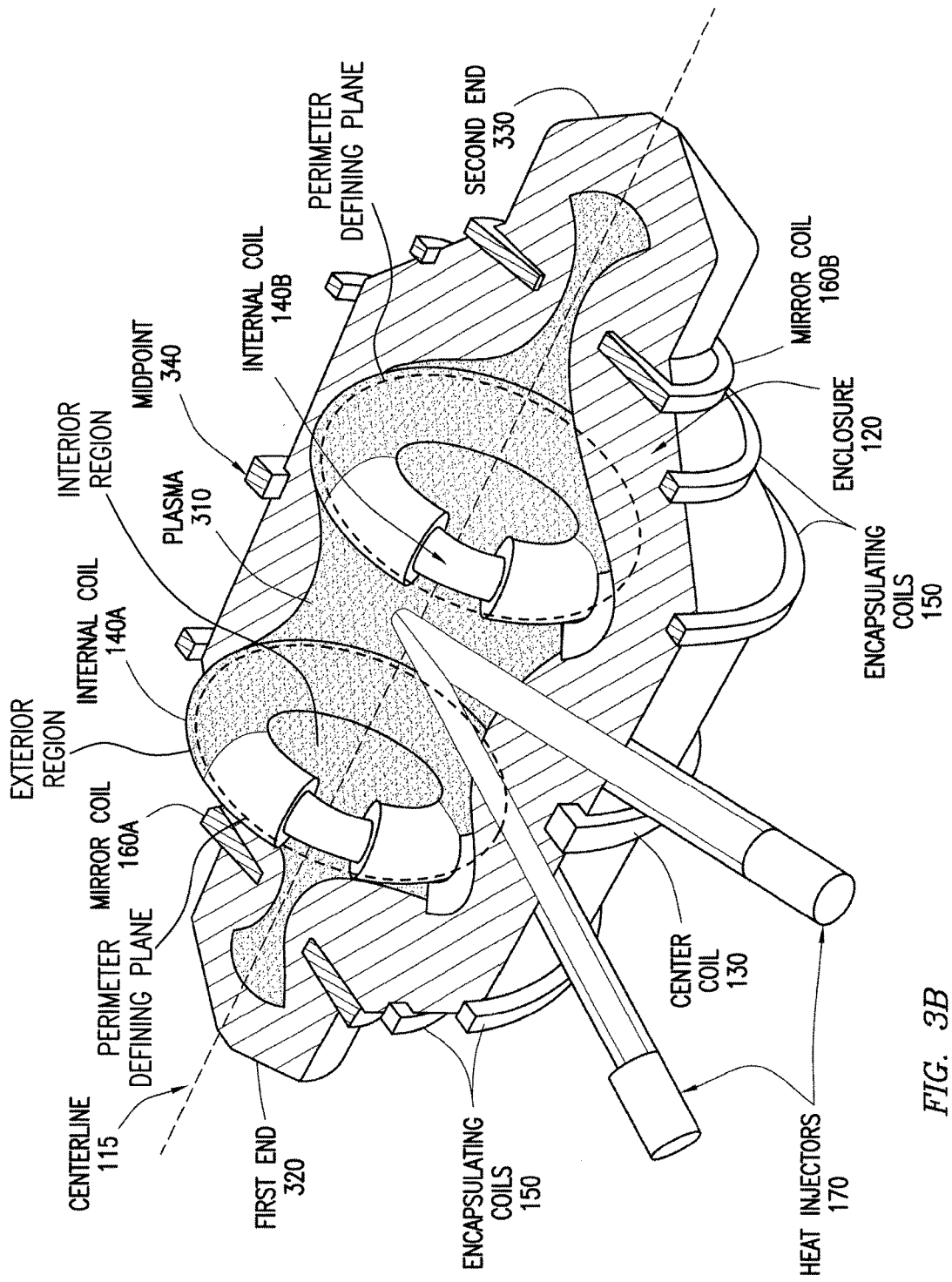

FIGS. 3A and 3B illustrate a fusion reactor 110 that may be utilized in the example applications of FIG. 1, according to certain embodiments. In general, fusion reactor 110 is an encapsulated linear ring cusp fusion reactor in which encapsulating magnetic coils 150 are used to prevent plasma that is generated using internal cusp magnetic coils from expanding. In some embodiments, fusion reactor 110 includes an enclosure 120 with a center line 115 running down the center of enclosure 120 as shown. In some embodiments, enclosure 120 includes a vacuum chamber and has a cross-section as discussed below in reference to FIG. 7. Fusion reactor 100 includes internal coils 140 (e.g., internal coils 140*a* and 140, also known as "cusp" coils), encapsulating coils 150, and mirror coils 160 (e.g., mirror coils 160*a* and 160*b*). Internal coils 140 are suspended within enclosure 120 by any appropriate means and are centered on center line 115. Encapsulating coils 150 are also centered on center line 115 and may be either internal or external to enclosure 120. For example, encapsulating coils 150 may be suspended within enclosure 120 in some embodiments. In other embodiments, encapsulating coils 150 may be external to enclosure 120 as illustrated in FIGS. 3A and 3B.

In general, fusion reactor 100 provides power by controlling and confining plasma 310 within enclosure 120 for a nuclear fusion process. Internal coils 140, encapsulating coils 150, and mirror coils 160 are energized to form magnetic fields which confine plasma 310 into a shape such as the shape shown in FIGS. 3B and 5. Certain gases, such as deuterium and tritium gases, may then be reacted to make energetic particles which heat plasma 310 and the walls of enclosure 120. The generated heat may then be used, for example, to power vehicles. For example, a liquid metal coolant such as FLiBe or LiPb may carry heat from the walls of fusion reactor 110 out to engines of an aircraft. In some embodiments, combustors in gas turbine engines may be replaced with heat exchangers that utilize the generated heat from fusion reactor 110. In some embodiments, electrical power may also be extracted from fusion reactor 110 via magnetohydrodynamic (MHD) processes.

Fusion reactor 110 is an encapsulated linear ring cusp fusion device. The main plasma confinement is accomplished in some embodiments by a central linear ring cusp (e.g., center coil 130) with two spindle cusps located axially on either side (e.g., internal coils 140). These confinement regions are then encapsulated (e.g., with encapsulating coils 150) within a coaxial mirror field provided by mirror coils 160.

The magnetic fields of fusion reactor 110 are provided by coaxially located magnetic field coils of varying sizes and currents. The ring cusp losses of the central region are mitigated by recirculation into the spindle cusps. This recirculating flow is made stable and compact by the encapsulating fields provided by encapsulating coils 150. The outward diffusion losses and axial losses from the main confinement zones are mitigated by the strong mirror fields of the encapsulating field provided by encapsulating coils 150. To function as a fusion energy producing device, heat is added to the confined plasma 310, causing it to undergo fusion reactions and produce heat. This heat can then be harvested to produce useful heat, work, and/or electrical power.

Fusion reactor 110 is an improvement over existing systems in part because global MHD stability can be preserved and the losses through successive confinement zones are more isolated due to the scattering of particles moving along the null lines. This feature means that particles moving along the center line are not likely to pass immediately out of the system, but will take many scattering events to leave the system. This increases their lifetime in the device, increasing the ability of the reactor to produce useful fusion power.

Fusion reactor 110 has novel magnetic field configurations that exhibit global MHD stability, has a minimum of particle losses via open field lines, uses all of the available magnetic field energy, and has a greatly simplified engineering design. The efficient use of magnetic fields means the disclosed embodiments may be an order of magnitude smaller than typical systems, which greatly reduces capital costs for power plants. In addition, the reduced costs allow the concept to be developed faster as each design cycle may be completed much quicker than typical system. In general, the disclosed embodiments have a simpler, more stable design with far less physics risk than existing systems.

Enclosure 120 is any appropriate chamber or device for containing a fusion reaction. In some embodiments, enclosure 120 is a vacuum chamber that is generally cylindrical in shape. In other embodiments, enclosure 120 may be a shape other than cylindrical. In some embodiments, enclosure 120 has a centerline 115 running down a center axis of enclosure 120 as illustrated. In some embodiments, enclosure 120 has a first end 320 and a second end 330 that is opposite from first end 320. In some embodiments, enclosure 120 has a midpoint 340 that is substantially equidistant between first end 320 and second end 330. A cross-section of a particular embodiment of enclosure 120 is discussed below in reference to FIG. 8.

Some embodiments of fusion reactor 110 may include a center coil 130. Center coil 130 is generally located proximate to midpoint 340 of enclosure 120. In some embodiments, center coil 130 is centered on center line 115 and is coaxial with internal coils 140. Center coil 130 may be either internal or external to enclosure 120, may be located at any appropriate axial position with respect to midpoint 340, may have any appropriate radius, may carry any appropriate current, and may have any appropriate ampturns.

Internal coils 140 are any appropriate magnetic coils that are suspended or otherwise positioned within enclosure 120. In some embodiments, internal coils 140 are superconducting magnetic coils. In some embodiments, internal coils 140 are toroidal in shape as shown in FIG. 3B. In some embodiments, internal coils 140 are centered on centerline 115. In some embodiments, internal coils 140 include two coils: a first internal coil 140a that is located between midpoint 340 and first end 320 of enclosure 120, and a second internal coil 140b that is located between midpoint 340 and second end 330 of enclosure 120. Internal coils 140 may be located at any appropriate axial position with respect to midpoint 340, may have any appropriate radius, may carry any appropriate current, and may have any appropriate ampturns. A particular embodiment of an internal coil 140 is discussed in more detail below in reference to FIG. 7.

Encapsulating coils 150 are any appropriate magnetic coils and generally have larger diameters than internal coils 140. In some embodiments, encapsulating coils 150 are centered on centerline 115 and are coaxial with internal coils 140. In general, encapsulating coils 150 encapsulate internal coils 140 and operate to close the original magnetic lines of internal coils 140 inside a magnetosphere. Closing these lines may reduce the extent of open field lines and reduce losses via recirculation. Encapsulating coils 150 also preserve the MHD stability of fusion reactor 110 by maintaining a magnetic wall that prevents plasma 310 from expanding. Encapsulating coils 150 have any appropriate cross-section, such as square or round. In some embodiments, encapsulating coils 150 are suspended within enclosure 120. In other embodiments, encapsulating coils 150 may be external to enclosure 120 as illustrated in FIGS. 3A and 3B. Encapsulating coils 150 may be located at any appropriate axial position with respect to midpoint 340, may have any appropriate radius, may carry any appropriate current, and may have any appropriate ampturns.

Fusion reactor 110 may include any number and arrangement of encapsulating coils 150. In some embodiments, encapsulating coils 150 include at least one encapsulating coil 150 positioned on each side of midpoint 340 of enclosure 120. For example, fusion reactor 110 may include two encapsulating coils 150: a first encapsulating coil 150 located between midpoint 340 and first end 320 of enclosure 120, and a second encapsulating coil 150 located between midpoint 340 and second end 330 of enclosure 120. In some embodiments, fusion reactor 110 includes a total of two, four, six, eight, or any other even number of encapsulating coils 150. In certain embodiments, fusion reactor 110 includes a first set of two encapsulating coils 150 located between internal coil 140a and first end 320 of enclosure 120, and a second set of two encapsulating coils 150 located between internal coil 140b and second end 330 of enclosure 120. While particular numbers and arrangements of encapsulating coils 150 have been disclosed, any appropriate number and arrangement of encapsulating coils 150 may be utilized by fusion reactor 110.

Mirror coils 160 are magnetic coils that are generally located close to the ends of enclosure 120 (i.e., first end 320 and second end 330). In some embodiments, mirror coils 160 are centered on center line 115 and are coaxial with internal coils 140. In general, mirror coils 160 serve to decrease the axial cusp losses and make all the recirculating field lines satisfy an average minimum-p, a condition that is not satisfied by other existing recirculating schemes. In some embodiments, mirror coils 160 include two mirror coils 160: a first mirror coil 160a located proximate to first end 320 of enclosure 120, and a second mirror coil 160b located proximate to second end 330 of enclosure 120. Mirror coils 160 may be either internal or external to enclosure 120, may be located at any appropriate axial position with respect to midpoint 340, may have any appropriate radius, may carry any appropriate current, and may have any appropriate ampturns.

In some embodiments, coils 130, 140, 150, and 160 are designed or chosen according to certain constraints. For example, coils 130, 140, 150, and 160 may be designed according to constraints including: high required currents (maximum in some embodiments of approx. 10 MegaAmp-turns); steady-state continuous operation; vacuum design (protected from plasma impingement), toroidal shape, limit outgassing; materials compatible with 150 C bakeout; thermal build-up; and cooling between shots.

Fusion reactor 110 may include one or more heat injectors 170. Heat injectors 170 are generally operable to allow any appropriate heat to be added to fusion reactor 110 in order to heat plasma 310. In some embodiments, for example, heat injectors 170 may be utilized to add neutral beams in order to heat plasma 310 within fusion reactor 110.

In operation, fusion reactor 110 generates fusion power by controlling the shape of plasma 310 for a nuclear fusion process using at least internal coils 140, encapsulating coils 150, and mirror coils 160. Internal coils 140 and encapsulating coils 150 are energized to form magnetic fields which confine plasma 310 into a shape such as the shape shown in FIGS. 3B and 5. Gases such as deuterium and tritium may then be reacted to make energetic particles which heat plasma 310 and the walls of enclosure 120. The generated heat may then be used for power. For example, a liquid metal coolant may carry heat from the walls of the reactor out to engines of an aircraft. In some embodiments, electrical power may also be extracted from fusion reactor 110 via MHD.

In order to expand the volume of plasma 310 and create a more favorable minimum-β geometry, the number of internal coils can be increased to make a cusp. In some embodiments of fusion reactor 110, the sum of internal coils 140, center coil 130, and mirror coils 160 is an odd number in order to obtain the encapsulation by the outer 'solenoid' field (i.e., the magnetic field provided by encapsulating coils 150). This avoids making a ring cusp field and therefor ruining the encapsulating separatrix. Two internal coils 140 and center coil 130 with alternating polarizations give a magnetic well with minimum-β characteristics within the cusp and a quasi-spherical core plasma volume. The addition of two axial 'mirror' coils (i.e., mirror coils 160) serves to decrease the axial cusp losses and more importantly makes the recirculating field lines satisfy average minimum-p, a condition not satisfied by other existing recirculating schemes. In some embodiments, additional pairs of internal coils 140 could be added to create more plasma volume in the well. However, such additions may increase the cost and complexity of fusion reactor 110 and may require additional supports for coils internal to plasma 310.

In the illustrated embodiments of fusion reactor 110, only internal coils 140 are within plasma 310. In some embodiments, internal coils 140 are suspending within enclosure 120 by one or more supports, such as support 750 illustrated in FIG. 7. While the supports sit outside the central core plasma well, they may still experience high plasma fluxes. Alternatively, internal coils 140 of some embodiments may be amenable to levitation, which would remove the risk and complexity of having support structures within plasma 310.

Figure 3C:
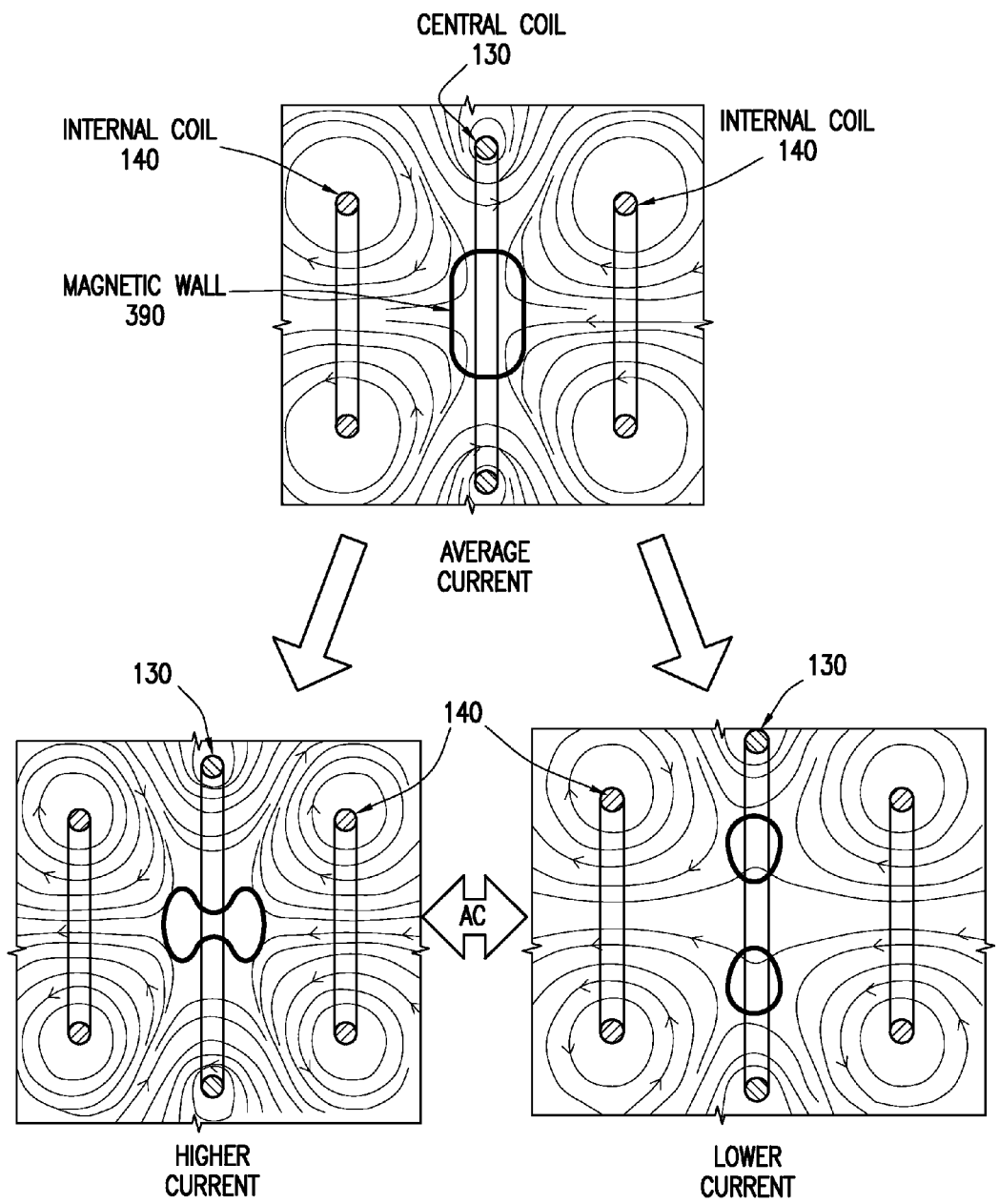
FIG. 3C illustrates the effects on the magnetic wall due to magnetic field oscillations in the fusion reactor, according to certain embodiments.

FIG. 3C illustrates the effects on magnetic wall 390 due to magnetic field oscillations in fusion reactor 110. As explained above, the magnetic field in fusion reactor 110 may be created by energizing coils such as central coil 130 and internal coils 140. This magnetic field may cause the formation of a magnetic wall 390 as shown in FIG. 3C, which may confine plasma 310 within fusion reactor 110. By varying the amount of energy applied to the coils in fusion reactor 110, the shape of the magnetic wall 390 may also be varied. For instance, as illustrated in FIG. 3C, increasing the amount of current in the central coil may cause the magnetic wall to take the form of a dumbell, while decreasing the amount of current in the central coil may cause the magnetic wall to take a toroidal form. Cycles of magnetic wall variation (such as between the bottom two states of FIG. 3C) may cause heating of plasma 310 through adiabatic compression. By cycling the magnetic field and staggering such variation is multiple regions of fusion reactor 110, adiabatic compression heating may be useful for steady-state operation of fusion reactions rather than just start-up phases. Heating using magnetic field oscillations may be used in addition to, or in lieu of, plasma heating using EM waves or neutral beam injection.

Adiabatic heating occurs in plasma as the magnetic flux through a gyro-orbiting particle is constant and the orbits are compressed at a rate faster than the dominant transport phenomena. This process directly increases the transverse energy of the particles, which in turn heats them. As plasma 310 is compressed by variations in the magnetic field, its temperature, density and confinement time all increase, resulting in increased fusion output and heating in the compressed state. If the field is then allowed to decrease, the plasma will expand and the process can be started anew. This process can be done continually in an AC fashion as described above or once at the start-up phase to initiate fusion conditions with minimal input power requirements. Heating of plasma 310 by magnetic field oscillations is particularly suited to configurations where surface magnetic fields contain a central plasma, such as in minimum-β devices such as fusion reactor 110.

As described above, central coil 130 can be controlled independently of internal coils 140 (or other coils of fusion reactor 110 such as encapsulating coils 150) and be used to compress plasma 310 confined by magnetic wall 390. In certain embodiments, plasma 310 may be mirror confined along the surface of magnetic wall 390 and may be adiabatically heated during compression. When compressed, the central field-free region may be reduced in volume. Thus, the density of plasma 310 may increase, boosting fusion reactions in fusion reactor 110. Once compressed, the energy output of the fusion reactions in the plasma may cause an increase in the temperature of plasma 310. As the magnetic fields are reduced in the cycling process described above, plasma 310 will cool down. However, the fusion output in the compressed state results in a net heating effect of plasma 310.

In some embodiments, the variation in energy applied to other coils (such as internal coils 140 or encapsulating coils 150) may also be used to further compress and decompress plasma 310. Such variation may be uniform among the various magnetic coils. Uniform variation may refer to variation of the electrical currents supplied to the magnetic coils in order to cause a uniform heating of plasma 310 in fusion reactor 110. Furthermore, in particular embodiments, variation of the electrical currents supplied to the magnetic coils may be non-uniform among the various magnetic coils in fusion reactor 110. Non-uniform variation may refer to using magnetic field oscillations from the different magnetic coils of fusion reactor 110 at different times. Such non-uniform variation of the magnetic fields may cause different portions of plasma 310 in fusion reactor 110 to be compressed at different locations within fusion reactor 110, may allow for plasma 310 to be evenly heated over time.

Figure 4:
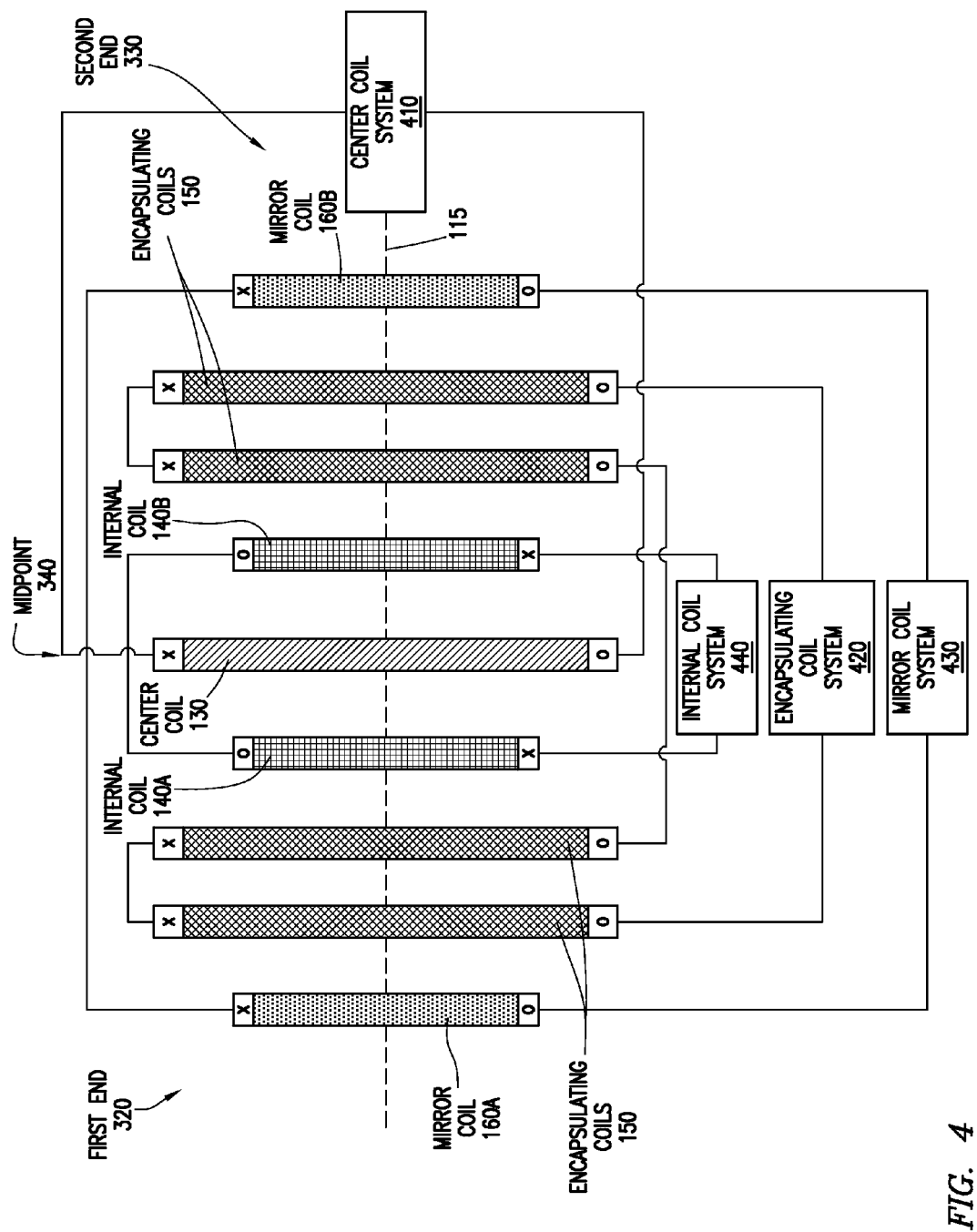
FIG. 4 illustrates a simplified view of the coils and example systems for energizing the coils of the fusion reactor of FIGS. 3A and 3B, according to certain embodiments.

FIG. 4 illustrates a simplified view of the coils of fusion reactor 110 and example systems for energizing the coils. In this embodiment, the field geometry is sized to be the minimum size necessary to achieve adequate ion magnetization with fields that can be produced by simple magnet technology. Adequate ion magnetization was considered to be ~5 ion gyro radii at design average ion energy with respect to the width of the recirculation zone. At the design energy of 100 eV plasma temperature there are 13 ion diffusion jumps and at full 20 KeV plasma energy there are 6.5 ion jumps. This is the lowest to maintain a reasonable magnetic field of 2.2 T in the cusps and keep a modest device size.

As illustrated in FIG. 4, certain embodiments of fusion reactor 110 include two mirror coils 160: a first mirror coil 160a located proximate to first end 320 of the enclosure and a second magnetic coil 160b located proximate to second end 330 of enclosure 120. Certain embodiments of fusion reactor 110 also include a center coil 130 that is located proximate to midpoint 340 of enclosure 120. Certain embodiments of fusion reactor 110 also include two internal coils 140: a first internal coil 140a located between center coil 130 and first end 320 of enclosure 120, and a second internal coil 140b located between center coil 130 and second end 330 of enclosure 120. In addition, certain embodiments of fusion reactor 110 may include two or more encapsulating coils 150. For example, fusion reactor 110 may include a first set of two encapsulating coils 150 located between first internal coil 140*a* and first end 320 of enclosure 120, and a second set of two encapsulating coils 150 located between second internal coil 140*b* and second end 330 of enclosure 120. In some embodiments, fusion reactor 110 may include any even number of encapsulating coils 150. In some embodiments, encapsulating coils 150 may be located at any appropriate position along center line 115 other than what is illustrated in FIG. 4. In general, encapsulating coils 150, as well as internal coils 140 and mirror coils 160, may be located at any appropriate position along center line 115 in order to maintain magnetic fields in the correct shape to achieve the desired shape of plasma 310.

In some embodiments, electrical currents are supplied to coils 130, 140, 150, and 160 as illustrated in FIG. 4. In this figure, each coil has been split along center line 115 and is represented by a rectangle with either an "X" or an "O" at each end. An "X" represents electrical current that is flowing into the plane of the paper, and an "O" represents electrical current that is flowing out the plane of the paper. Using this nomenclature, FIG. 4 illustrates how in this embodiment of fusion reactor 110, electrical currents flow in the same direction through encapsulating coils 150, center coil 130, and mirror coils 160 (i.e., into the plane of the paper at the top of the coils), but flow in the opposite direction through internal coils 140 (i.e., into the plane of the paper at the bottom of the coils).

In some embodiments, the field geometry of fusion reactor 110 may be sensitive to the relative currents in the coils, but the problem can be adequately decoupled to allow for control. First, the currents to opposing pairs of coils can be driven in series to guarantee that no asymmetries exist in the axial direction. The field in some embodiments is most sensitive to the center three coils (e.g., internal coils 140 and center coil 130). With the currents of internal coil 140 fixed, the current in center coil 130 can be adjusted to tweak the shape of the central magnetic well. This region can be altered into an axial-oriented 'bar-bell' shape by increasing the current on center coil 130 as the increase in flux 'squeezes' the sphere into the axial shape. Alternatively, the current on center coil 130 can be reduced, resulting in a ring-shaped magnetic well at midpoint 340. The radius of center coil 130 also sets how close the ring cusp null-line comes to internal coils 140 and may be chosen in order to have this null line close to the middle of the gap between center coil 130 and internal coils 140 to improve confinement.

The radius of internal coils 140 serves to set the balance of the relative field strength between the point cusps and the ring cusps for the central well. The baseline sizes may be chosen such that these field values are roughly equal. While it would be favorable to reduce the ring cusp losses by increasing the relative flux in this area, a balanced approach may be more desirable.

In some embodiments, the magnetic field is not as sensitive to mirror coils 160 and encapsulating coils 150, but their dimensions should be chosen to achieve the desired shape of plasma 310. In some embodiments, mirror coils 160 may be chosen to be as strong as possible without requiring more complex magnets, and the radius of mirror coils 160 may be chosen to maintain good diagnostic access to the device center. Some embodiments may benefit from shrinking mirror coils 160, thereby achieving higher mirror ratios for less current but at the price of reduced axial diagnostic access.

In general, encapsulating coils 150 have weaker magnetic fields than the other coils within fusion reactor 110. Thus, the positioning of encapsulating coils 150 is less critical than the other coils. In some embodiments, the positions of encapsulating coils 150 are defined such that un-interrupted access to the device core is maintained for diagnostics. In some embodiments, an even number of encapsulating coils 150 may be chosen to accommodate supports for internal coils 140. The diameters of encapsulating coils 150 are generally greater than those of internal coils 140, and may be all equal for ease of manufacture and common mounting on or in a cylindrical enclosure 120. In some embodiments, encapsulating coils 150 may be moved inward to the plasma boundary, but this may impact manufacturability and heat transfer characteristics of fusion reactor 110.

In some embodiments, fusion reactor 110 includes various systems for energizing center coil 130, internal coils 140, encapsulating coils 150, and mirror coils 160. For example, a center coil system 410, an encapsulating coil system 420, a mirror coil system 430, and an internal coil system 440 may be utilized in some embodiments. Coil systems 410-440 and coils 130-160 may be coupled as illustrated in FIG. 4. Coil systems 410-440 may be any appropriate systems for driving any appropriate amount of electrical currents through coils 130-160. Center coil system 410 may be utilized to drive center coil 130, encapsulating coil system 420 may be utilized to drive encapsulating coils 150, mirror coil system 430 may be utilized to drive mirror coils 160, and internal coil system 440 may be utilized to drive internal coils 140. In other embodiments, more or fewer coil systems may be utilized than those illustrated in FIG. 4. In general, coil systems 410-440 may include any appropriate power sources such as battery banks.

Figure 5:
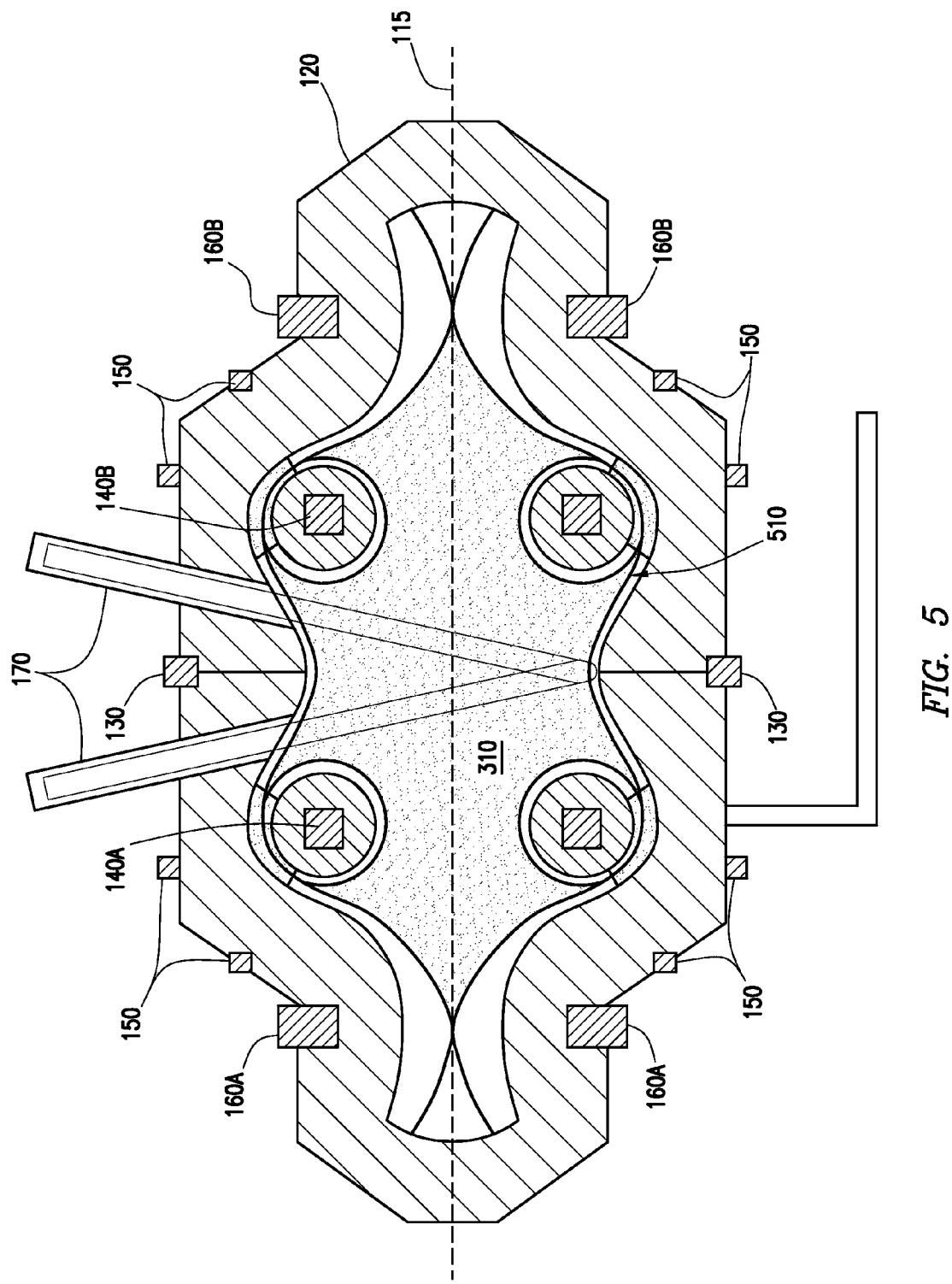
FIG. 5 illustrates plasma within the fusion reactor of FIGS. 3A and 3B, according to certain embodiments.

FIG. 5 illustrates plasma 310 within enclosure 120 that is shaped and confined by center coil 130, internal coils 140, encapsulating coils 150, and mirror coils 160. As illustrated, an external mirror field is provided by mirror coils 160. The ring cusp flow is contained inside the mirror. A trapped magnetized sheath 510 that is provided by encapsulating coils 150 prevents detachment of plasma 310. Trapped magnetized sheath 510 is a magnetic wall that causes plasma 310 to recirculate and prevents plasma 310 from expanding outward. The recirculating flow is thus forced to stay in a stronger magnetic field. This provides complete stability in a compact and efficient cylindrical geometry. Furthermore, the only losses from plasma exiting fusion reactor 110 are at two small point cusps at the ends of fusion reactor 110 along center line 115. This is an improvement over typical designs in which plasma detaches and exits at other locations.

The losses of certain embodiments of fusion reactor 110 are also illustrated in FIG. 5. As mentioned above, the only losses from plasma exiting fusion reactor 110 are at two small point cusps at the ends of fusion reactor 110 along center line 115. Other losses may include diffusion losses due to internal coils 140 and axial cusp losses. In addition, in embodiments in which internal coils 140 are suspended within enclosure 120 with one or more supports (e.g., "stalks"), fusion reactor 110 may include ring cusp losses due to the supports.

In some embodiments, internal coils 140 may be designed in such a way as to reduce diffusion losses. For example, certain embodiments of fusion reactor 110 may include internal coils 140 that are configured to conform to the shape of the magnetic field. This may allow plasma 310, which follows the magnetic field lines, to avoid touching internal coils 140, thereby reducing or eliminating losses. An example embodiment of internal coils 140 illustrating a conformal shape is discussed below in reference to FIG. 7.

Figure 6:
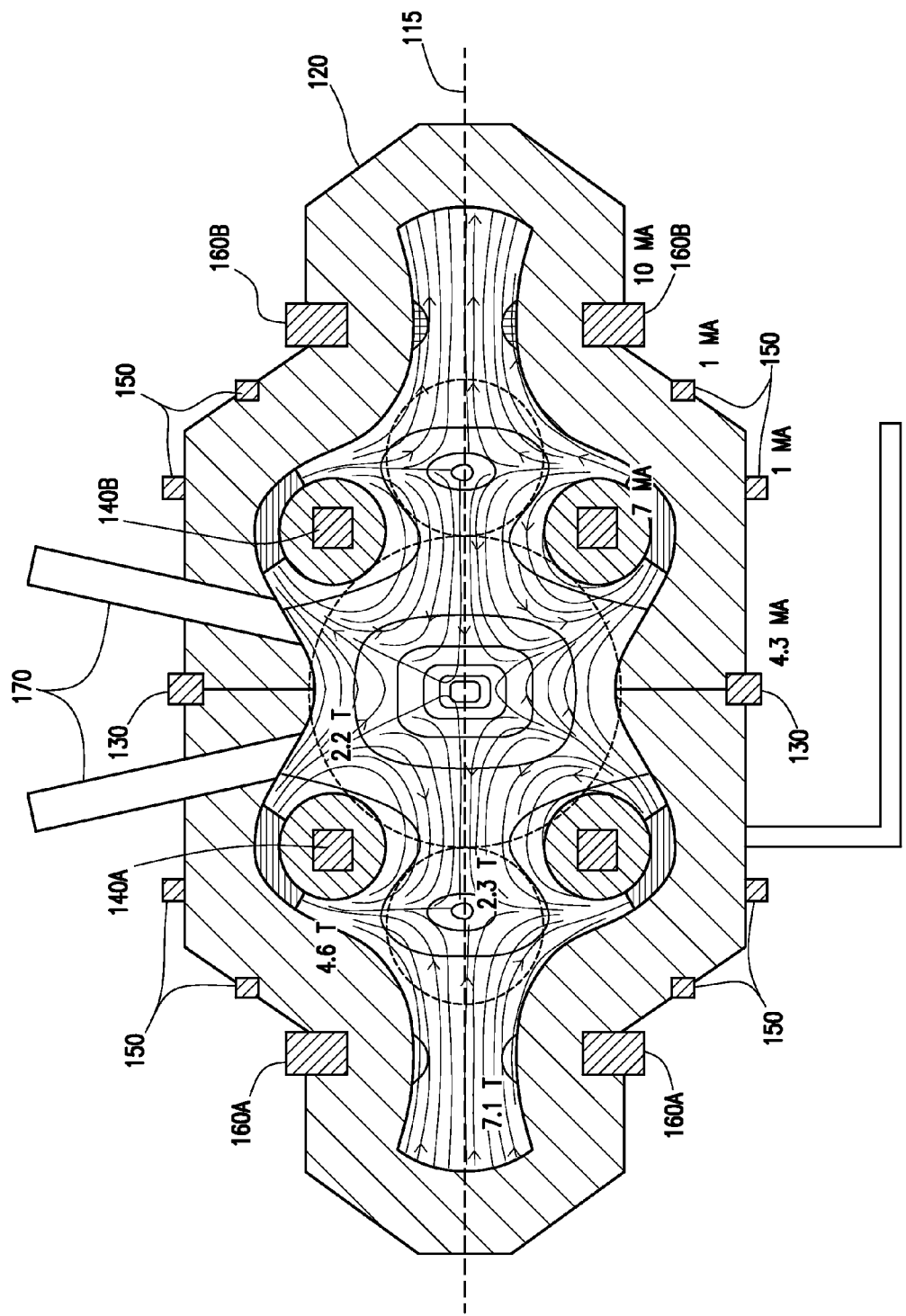
FIG. 6 illustrates magnetic fields of the fusion reactor of FIGS. 3A and 3B, according to certain embodiments.

FIG. 6 illustrates a magnetic field of certain embodiments of fusion reactor 110. In general, fusion reactor 110 is designed to have a central magnetic well that is desired for high beta operation and to achieve higher plasma densities. As illustrated in FIG. 6, the magnetic field may include three magnetic wells. The central magnetic well can expand with high Beta, and fusion occurs in all three magnetic wells. Another desired feature is the suppression of ring cusp losses. As illustrated in FIG. 6, the ring cusps connect to each other and recirculate. In addition, good MHD stability is desired in all regions. As illustrated in FIG. 6, only two field penetrations are needed and MHD interchange is satisfied everywhere.

In some embodiments, the magnetic fields can be altered without any relocation of the coils by reducing the currents, creating for example weaker cusps and changing the balance between the ring and point cusps. The polarity of the currents could also be reversed to make a mirror-type field and even an encapsulated mirror. In addition, the physical locations of the coils could be altered.

Figure 7:
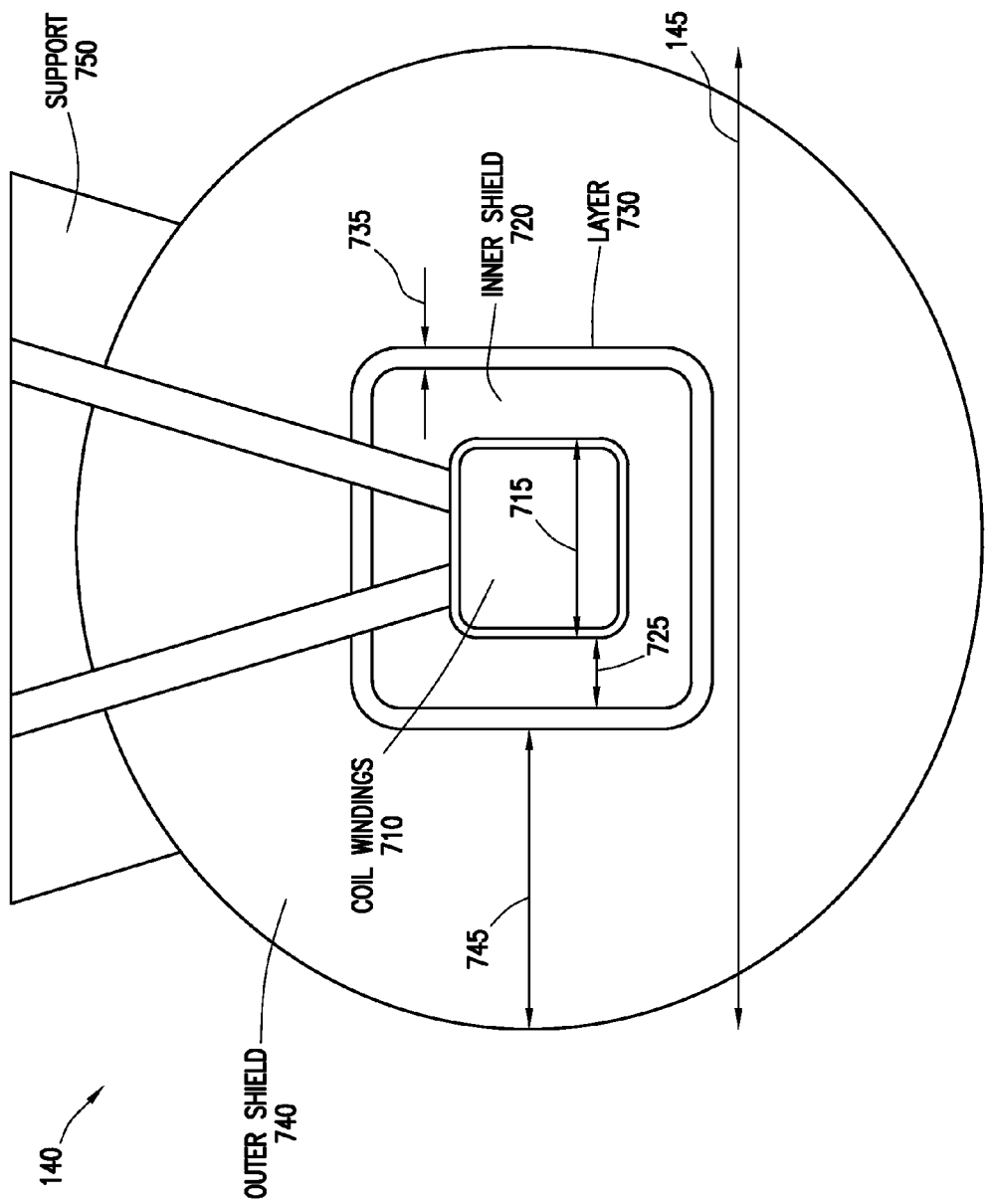
FIG. 7 illustrates an internal coil of the fusion reactor of FIGS. 3A and 3B, according to certain embodiments.

FIG. 7 illustrates an example embodiment of an internal coil 140 of fusion reactor 110. In this embodiment, internal coil 140 includes coil windings 710, inner shield 720, layer 730, and outer shield 740. In some embodiments, internal coil 140 may be suspending within enclosure 120 with one or more supports 750. Coil windings 710 may have a width 715 and may be covered in whole or in part by inner shield 720. Inner shield 720 may have a thickness 725 and may be covered in whole or in part by layer 730. Layer 730 may have a thickness 735 and may be covered in whole or in part by outer shield 740. Outer shield may have a thickness 745 and may have a shape that is conformal to the magnetic field within enclosure 120. In some embodiments, internal coil 140 may have an overall diameter of approximately 1.04 m.

Coil windings 710 form a superconducting coil and carry an electric current that is typically in an opposite direction from encapsulating coils 150, center coil 130, and mirror coils 160. In some embodiments, width 715 of coils winding is approximately 20 cm. Coil windings 710 may be surrounded by inner shield 720. Inner shield 720 provides structural support, reduces residual neutron flux, and shields against gamma rays due to impurities. Inner shield 720 may be made of Tungsten or any other material that is capable of stopping neutrons and gamma rays. In some embodiments, thickness 725 of inner shield 720 is approximately 11.5 cm.

In some embodiments, inner shield 720 is surrounded by layer 730. Layer 730 may be made of lithium (e.g., lithium-6) and may have thickness 735 of approximately 5 mm. Layer 730 may be surrounded by outer shield 740. Outer shield 740 may be made of FLiBe and may have thickness 745 of approximately 30 cm. In some embodiments, outer shield may be conformal to magnetic fields within enclosure 120 in order to reduce losses. For example, outer shield 740 may form a toroid.

Figure 8:
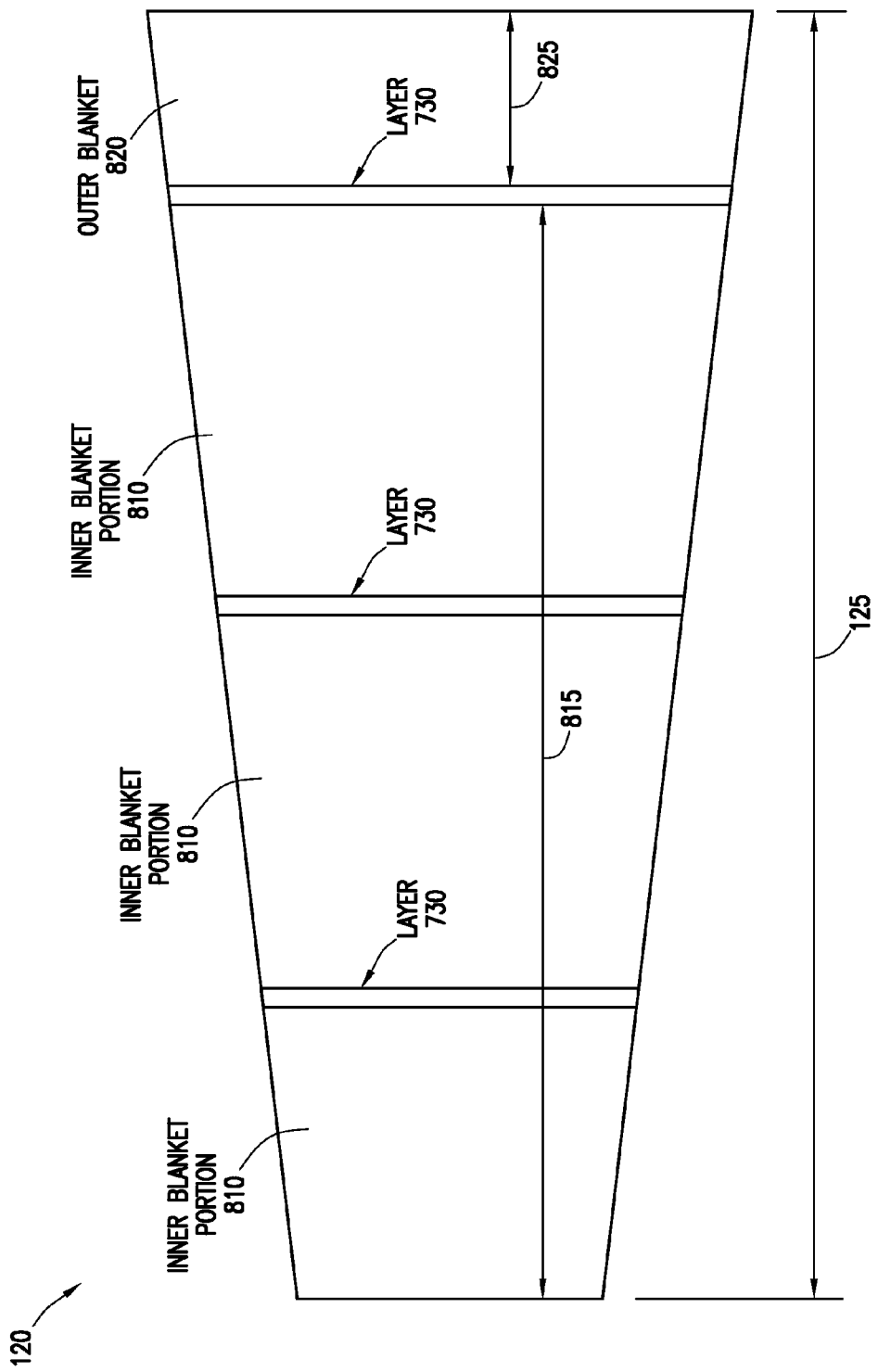
FIG. 8 illustrates a cut-away view of the enclosure of the fusion reactor of FIGS. 3A and 3B, according to certain embodiments.

FIG. 8 illustrates a cut-away view of enclosure 120 of certain embodiments of fusion reactor 110. In some embodiments, enclosure 120 includes one or more inner blanket portions 810, an outer blanket 820, and one or more layers 730 described above. In the illustrated embodiment, enclosure 120 includes three inner blanket portions 810 that are separated by three layers 730. Other embodiments may have any number or configuration of inner blanket portions 810, layers 730, and outer blanket 820. In some embodiments, enclosure 120 may have a total thickness 125 of approximately 80 cm in many locations. In other embodiments, enclosure 120 may have a total thickness 125 of approximately 1.50 m in many locations. However, thickness 125 may vary over the length of enclosure 120 depending on the shape of the magnetic field within enclosure 120 (i.e., the internal shape of enclosure 120 may conform to the magnetic field as illustrated in FIG. 3b and thus many not be a uniform thickness 125).

In some embodiments, inner blanket portions 810 have a combined thickness 815 of approximately 70 cm. In other embodiments, inner blanket portions 810 have a combined thickness 815 of approximately 126 cm. In some embodiments, inner blanket portions are made of materials such as Be, FLiBe, and the like.

Outer blanket 820 is any low activation material that does not tend to become radioactive under irradiation. For example, outer blanket 820 may be iron or steel. In some embodiments, outer blanket 820 may have a thickness 825 of approximately 10 cm.

Figure 9:
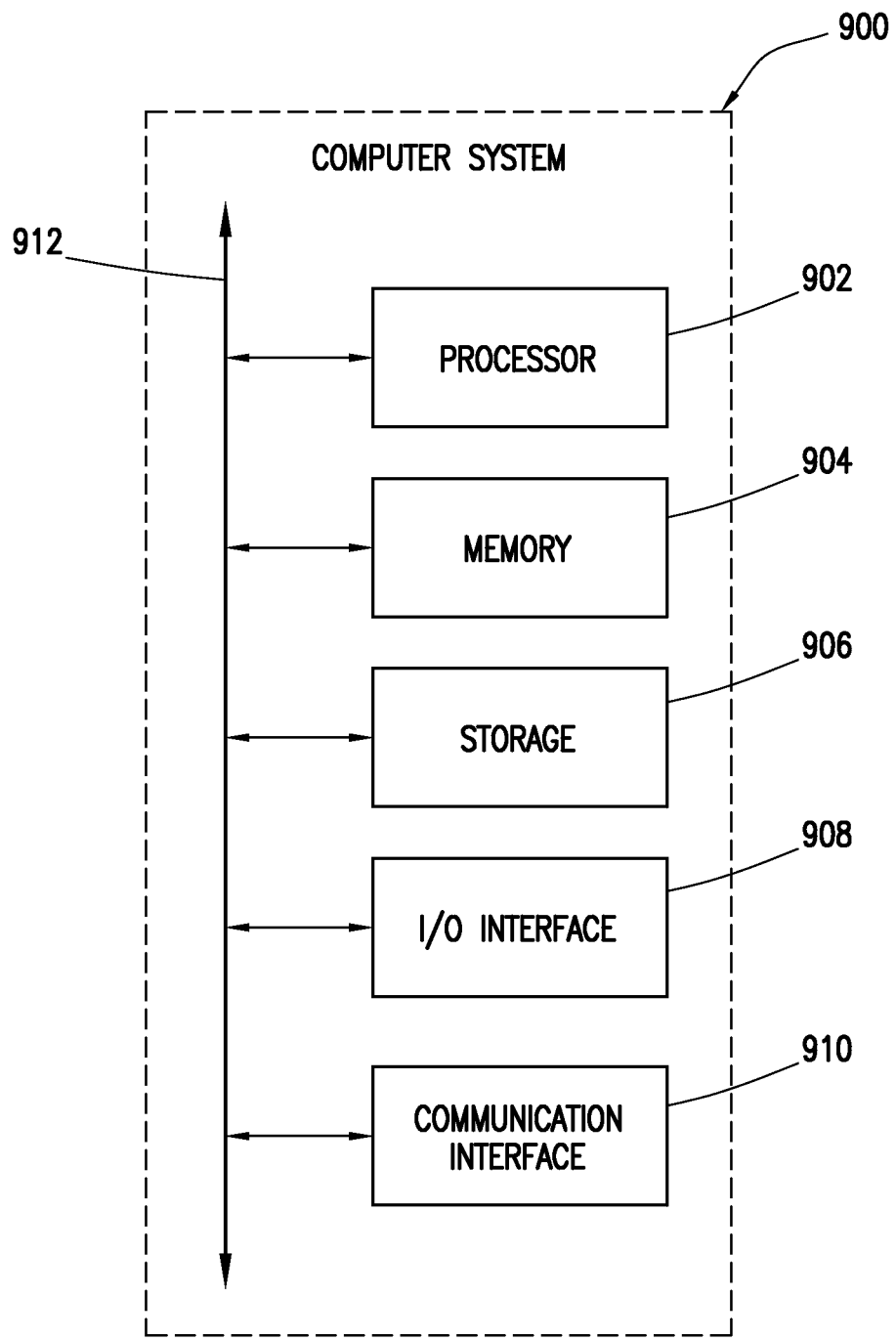
FIG. 9 illustrates an example computer system, according to certain embodiments.

FIG. 9 illustrates an example computer system 900. In particular embodiments, one or more computer systems 900 are utilized by fusion reactor 110 for any aspects requiring computerized control. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe', a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system comprising:
an enclosure;
two internal magnetic coils suspended within an interior of the enclosure and co-axial with a center axis of the enclosure, the two internal magnetic coils each having a toroidal shape, each of the two internal magnetic coils having a perimeter that defines a plane having an interior region extending inwardly from the perimeter towards a center of the internal magnetic coil and an exterior region extending outwardly from the perimeter and the center of the internal magnetic coil, wherein the two internal magnetic coils are operable to confine plasma within the enclosure in at least both the exterior regions and the interior regions of each of the plurality of internal magnetic coils;
a plurality of encapsulating magnetic coils co-axial with the center axis of the enclosure, the encapsulating magnetic coils having a larger diameter than the internal magnetic coils;
a center magnetic coil co-axial with the center axis of the enclosure and located proximate to the midpoint of the enclosure; and
one or more coil systems configured to supply the two internal magnetic coils, plurality of encapsulating magnetic coils, and center magnetic coil with electrical currents to form magnetic fields for confining plasma within the enclosure; and
wherein the one or more coil systems are configured to:
supply the magnetic coils with electrical currents to form magnetic fields for confining plasma within a magnetized sheath in the enclosure, wherein the magnetized plasma sheath and plasma confined within the magnetized sheath encircle each of the two internal magnetic coils; and
heat the plasma confined within the magnetized sheath in the enclosure by varying the electrical currents supplied to one or more of the magnetic coils;
wherein the center magnetic coil is disposed outside the interior of the enclosure.

2. The system of claim 1, wherein the one or more coil systems are configured to supply electrical currents that cause the magnetic coils two internal magnetic coils, plurality of encapsulating magnetic coils, and center magnetic coil to form the magnetized sheath, wherein the magnetized sheath prevents plasma within the enclosure from expanding.

3. The system of claim 1, wherein the one or more coil systems are configured to supply electrical currents that cause the two internal magnetic coils, plurality of encapsulating magnetic coils, and center magnetic coil to form magnetic fields that mirror confine the plasma along the surface of the magnetized sheath.

4. The system of claim 1, wherein the one or more coil systems are configured to vary the electrical currents supplied to the center magnetic coil to heat the plasma confined within the enclosure.

5. The system of claim 4, wherein the one or more coil systems are configured to vary the electrical currents supplied to the internal magnetic coils to heat the plasma confined within the enclosure.

6. The system of claim 5, wherein the one or more coil systems are configured to vary the electrical currents supplied to the encapsulating magnetic coils to heat the plasma confined within the enclosure.

7. The system of claim 1, wherein the one or more coil systems are configured to uniformly vary the electrical currents supplied to the two internal magnetic coils, plurality of encapsulating magnetic coils, and center magnetic coil.

8. The system of claim 1, wherein the one or more coil systems are configured to non-uniformly vary the electrical currents supplied to the two internal magnetic coils, plurality of encapsulating magnetic coils, and center magnetic coil.

9. A system comprising:
two internal magnetic coils suspended within an interior of an enclosure, each of the two internal magnetic coils having a perimeter that defines a plane having an interior region extending inwardly from the perimeter towards a center of the internal magnetic coil and an exterior region extending outwardly from the perimeter and the center of the internal magnetic coil, wherein the two internal magnetic coils are operable to confine plasma within the enclosure in at least both the exterior regions and the interior regions of each of the two internal magnetic coils;
a center magnetic coil coaxial with the two internal magnetic coils and located proximate to a midpoint of the enclosure;
a plurality of encapsulating magnetic coils coaxial with the internal magnetic coils, the encapsulating magnetic coils being operable to preserve magnetohydrodynamic (MHD) stability by maintaining a magnetized sheath that prevents plasma within the enclosure from expanding, wherein the magnetized plasma sheath and plasma confined within the magnetized sheath encircle each of the two internal magnetic coils; and
two mirror magnetic coils coaxial with the internal magnetic coils; and
one or more coil systems configured heat the plasma confined within the magnetized sheath by varying electrical currents supplied to one or more of the two internal magnetic coils, plurality of encapsulating magnetic coils, and center magnetic coil;
wherein the center magnetic coil is disposed outside the interior of the enclosure.

10. The system of claim 9, wherein the one or more coil systems are configured to supply electrical currents that cause the two internal magnetic coils, plurality of encapsulating magnetic coils, and center magnetic coil to form magnetic fields that mirror confine the plasma along the surface of the magnetized sheath.

11. The system of claim 9, wherein the one or more coil systems are configured to vary the electrical currents supplied to the center magnetic coil to heat the plasma confined within the enclosure.

12. The system of claim 11, wherein the one or more coil systems are configured to vary the electrical currents supplied to the internal magnetic coils to heat the plasma confined within the enclosure.

13. The system of claim 12, wherein the one or more coil systems are configured to vary the electrical currents supplied to the encapsulating magnetic coils to heat the plasma confined within the enclosure.

14. The system of claim 9, wherein the one or more coil systems are configured to uniformly vary the electrical currents supplied to the two internal magnetic coils, plurality of encapsulating magnetic coils, and center magnetic coil.

15. The system of claim 9, wherein the one or more coil systems are configured to non-uniformly vary the electrical currents supplied to the two internal magnetic coils, plurality of encapsulating magnetic coils, and center magnetic coil.

16. A method comprising:
providing two internal magnetic coils suspended within an interior of an enclosure, each of the two internal magnetic coils having a perimeter that defines a plane having an interior region extending inwardly from the perimeter towards a center of the internal magnetic coil and an exterior region extending outwardly from the perimeter and the center of the internal magnetic coil;
confining plasma within the enclosure in at least both the exterior regions and the interior regions of each of the two internal magnetic coils by energizing the two internal magnetic coils;
energizing a center magnetic coil coaxial with the two internal magnetic coils and located proximate to a midpoint of the enclosure;
energizing a plurality of encapsulating magnetic coils coaxial with the internal magnetic coils, the encapsulating magnetic coils being operable, when energized, to preserve magnetohydrodynamic (MHD) stability by maintaining a magnetized sheath that prevents plasma within the enclosure from expanding, wherein the magnetized plasma sheath and plasma confined within the magnetized sheath encircle each of the two internal magnetic coils;
energizing two mirror magnetic coils coaxial with the internal magnetic coils; and
heating the plasma confined within the magnetized sheath by varying electrical currents supplied to one or more of the two internal magnetic coils, plurality of encapsulating magnetic coils, and center magnetic coil;
wherein the center magnetic coil is disposed outside the interior of the enclosure.

17. The method of claim 16, wherein varying electrical currents supplied to one or more of the two internal magnetic coils, plurality of encapsulating magnetic coils, and center magnetic coil comprises varying the electrical currents supplied to the center magnetic coil to heat the plasma confined within the enclosure.

18. The method of claim 17, wherein varying electrical currents supplied to one or more of the two internal magnetic coils, plurality of encapsulating magnetic coils, and center magnetic coil comprises varying the electrical currents supplied to the internal magnetic coils to heat the plasma confined within the enclosure.

19. The method of claim 18, wherein varying electrical currents supplied to one or more of the two internal magnetic coils, plurality of encapsulating magnetic coils, and center magnetic coil comprises varying the electrical currents supplied to the encapsulating magnetic coils to heat the plasma confined within the enclosure.

20. The method of claim 16, wherein varying electrical currents supplied to one or more of the two internal magnetic coils, plurality of encapsulating magnetic coils, and center magnetic coil comprises uniformly varying the electrical currents supplied to the two internal magnetic coils, plurality of encapsulating magnetic coils, and center magnetic coil.

21. The system of claim 9, wherein the two mirror magnetic coils comprise a first and second mirror magnetic coils disposed on opposite sides of the center magnetic coil.

22. The system of claim 9, wherein the one or more coil systems comprise:
   a center coil system configured to supply first electrical currents flowing in a first direction through the center magnetic coil;
   an internal coil system configured to supply second electrical currents flowing in a second direction through each of the two internal magnetic coils;
   an encapsulating coil system configured to supply third electrical currents flowing in the first direction through each of the plurality of encapsulating magnetic coils; and
   a mirror coil system configured to supply fourth electrical currents flowing in the first direction through each of the two mirror magnetic coils.

23. The system of claim 9, wherein each of the two internal magnetic coils comprise at least a first shielding surrounding the internal magnetic coil and each of the plurality of internal magnetic coils is suspended within the enclosure by at least one support.

24. The method of claim 16, wherein the two mirror magnetic coils comprise a first and second mirror magnetic coils disposed on opposite sides of the center magnetic coil.

25. The method of claim 16, wherein:
   energizing the center magnetic coil, the two internal magnetic coils, and the plurality of encapsulating coils comprises supplying electrical currents flowing in a first direction through each of the center magnetic coil, the two internal magnetic coils, and the plurality of encapsulating coils; and
   energizing the two internal magnetic coils comprises supplying electrical currents flowing in a second direction through each of the two internal magnetic coils, the second direction opposite the first direction.

26. The method of claim 16, wherein each of the two internal magnetic coils comprise at least a first shielding surrounding the internal magnetic coil and each of the plurality of internal magnetic coils is suspended within the enclosure by at least one support.

* * * * *

UNITED STATES PATENT AND TRADEMARK OFFICE
CERTIFICATE OF CORRECTION

PATENT NO. : 9,928,927 B2
APPLICATION NO. : 14/243447
DATED : March 27, 2018
INVENTOR(S) : Thomas John McGuire Page 1 of 1

It is certified that error appears in the above-identified patent and that said Letters Patent is hereby corrected as shown below:

In the Claims

Column 16, Line 53: After "cause the" and Before "two internal magnetic coils, plu-" Delete "magnetic coils".

Signed and Sealed this
Twenty-fifth Day of February, 2020

Andrei Iancu
*Director of the United States Patent and Trademark Office*